United States Patent
Bauer

(10) Patent No.: US 10,711,424 B2
(45) Date of Patent: Jul. 14, 2020

(54) FOUNDATION ELEMENT AND METHOD FOR PRODUCING A FOUNDATION ELEMENT

(71) Applicant: BAUER Spezialtiefbau GmbH, Schrobenhausen (DE)

(72) Inventor: Florian Bauer, Schrobenhausen (DE)

(73) Assignee: BAUER Spezialtiefbau GmbH, Schrobenhausen (DE)

(*) Notice: Subject to any disclaimer, the term of this patent is extended or adjusted under 35 U.S.C. 154(b) by 0 days.

(21) Appl. No.: 15/701,588

(22) Filed: Sep. 12, 2017

(65) Prior Publication Data

US 2018/0135270 A1    May 17, 2018

(30) Foreign Application Priority Data

Nov. 11, 2016  (EP) .................................. 16198414

(51) Int. Cl.
| | |
|---|---|
| *E02D 5/34* | (2006.01) |
| *E02D 27/14* | (2006.01) |
| *E02D 27/42* | (2006.01) |
| *F24T 10/13* | (2018.01) |
| *F24T 10/00* | (2018.01) |

(52) U.S. Cl.
CPC ............ *E02D 27/14* (2013.01); *E02D 27/425* (2013.01); *F24T 10/13* (2018.05); *E02D 5/34* (2013.01); *F24T 2010/50* (2018.05); *Y02E 10/10* (2013.01)

(58) Field of Classification Search
CPC . F24T 10/00; F24T 10/10; F24T 10/13; F24T 10/15; F24T 10/17; F24J 3/08
See application file for complete search history.

(56) References Cited

U.S. PATENT DOCUMENTS

| | | | | |
|---|---|---|---|---|
| 3,447,532 | A | * 6/1969 | Poppendiek | ........ B01F 3/04007 126/263.01 |
| 5,590,715 | A | * 1/1997 | Amerman | ............... E21B 23/00 166/290 |
| 2005/0139353 | A1 | * 6/2005 | Johnson, Jr. | ............... E21B 7/24 166/165 |
| 2009/0065255 | A1 | * 3/2009 | Roussy | ..................... E21B 7/24 175/56 |

FOREIGN PATENT DOCUMENTS

| | | | |
|---|---|---|---|
| CN | 101458013 A | * | 6/2009 |
| DE | 3149636 A1 | * | 7/1983 |
| DE | 10 2012 020871 A1 | | 4/2014 |

(Continued)

OTHER PUBLICATIONS

Abstract of Korean document 2015032677, date Mar. 2015, pp. 1.*

(Continued)

*Primary Examiner* — Sunil Singh
(74) *Attorney, Agent, or Firm* — Studebaker & Brackett PC

(57) ABSTRACT

The invention relates to a foundation element in the ground and to a method for producing the foundation element which is formed of a hardenable mass, wherein, prior to hardening, at least one heat exchanger element is inserted. According to the invention a transition region towards the surrounding ground is provided, in which the foundation element is formed of crushed ground material of the surrounding ground with a hardening suspension.

12 Claims, 4 Drawing Sheets

(56) References Cited

FOREIGN PATENT DOCUMENTS

| | | | |
|---|---|---|---|
| DE | 10 2012 024412 A1 | | 6/2014 |
| JP | 2000-161793 A | * | 6/2000 |
| JP | 2004-177013 A | | 6/2004 |
| JP | 2006-029006 A | | 2/2006 |
| JP | 2006-349295 A | | 12/2006 |
| JP | 2007-010183 A | | 1/2007 |
| JP | 2009-257081 A | | 11/2009 |
| JP | 4594956 B2 | * | 12/2010 |
| JP | 2012-097984 A | | 5/2012 |
| KR | 2015032677 A | * | 3/2015 |

OTHER PUBLICATIONS

The extended European search report issued by the European Patent Office dated Dec. 23, 2016, which corresponds to EP16 19 8414.
An Office Action mailed by the Japanese Patent Office dated Aug. 14, 2018, which corresponds to Japanese Patent Application No. 2017-153789 and is related to U.S. Appl. No. 15/701,588; with English translation.
An Office Action issued by the European Patent Office dated Feb. 20, 2019, which corresponds to European Patent Application No. 16 198 414.1-1002 and is related to U.S. Appl. No. 15/701,588.
An Office Action mailed by the Japanese Patent Office dated Mar. 26, 2019, which corresponds to Japanese Patent Application No. 2017-153789 and is related to U.S. Appl. No. 15/701,588; with English translation.

* cited by examiner

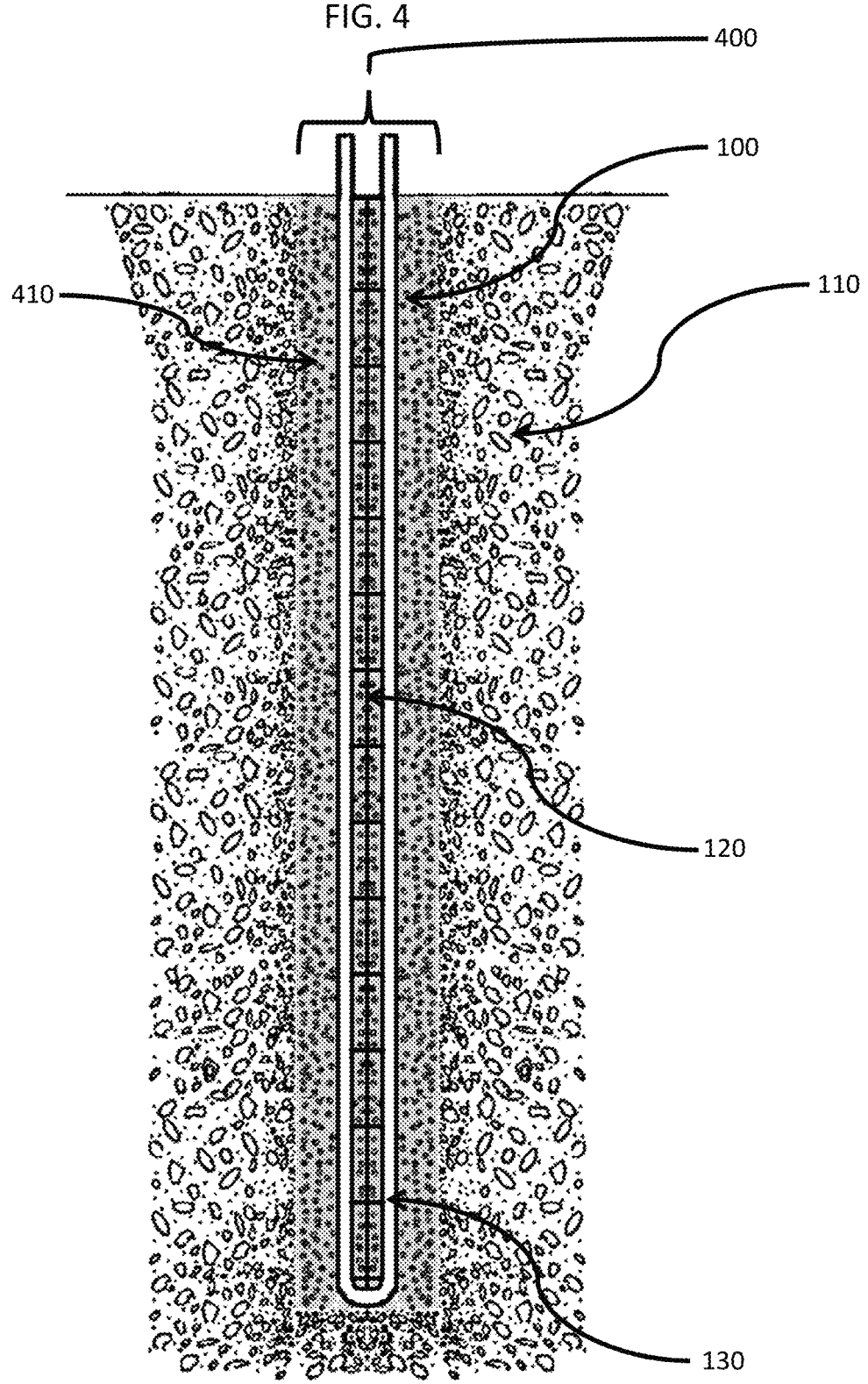

FOUNDATION ELEMENT AND METHOD FOR PRODUCING A FOUNDATION ELEMENT

FIELD OF THE INVENTION

The invention relates to a foundation element in the ground, which is formed of a hardenable mass, wherein, prior to hardening, at least one heat exchanger element is inserted.

BACKGROUND

FIGS. 1 and 2 illustrate a prior art configuration in which a borehole 100 is formed in the ground 110. A heat exchanger 130 is inserted into the borehole 100, and a reinforcing member 120 is provided to support the heat exchanger 130. As shown in FIG. 2, the borehole 100 is filled with grout, which, when hardened, creates a foundation element.

BRIEF DESCRIPTION OF THE DRAWINGS

FIG. 4 illustrates a foundation element including a transition region according to a disclosed embodiment.

DETAILED DESCRIPTION OF THE PREFERRED EMBODIMENTS

Figure 1:
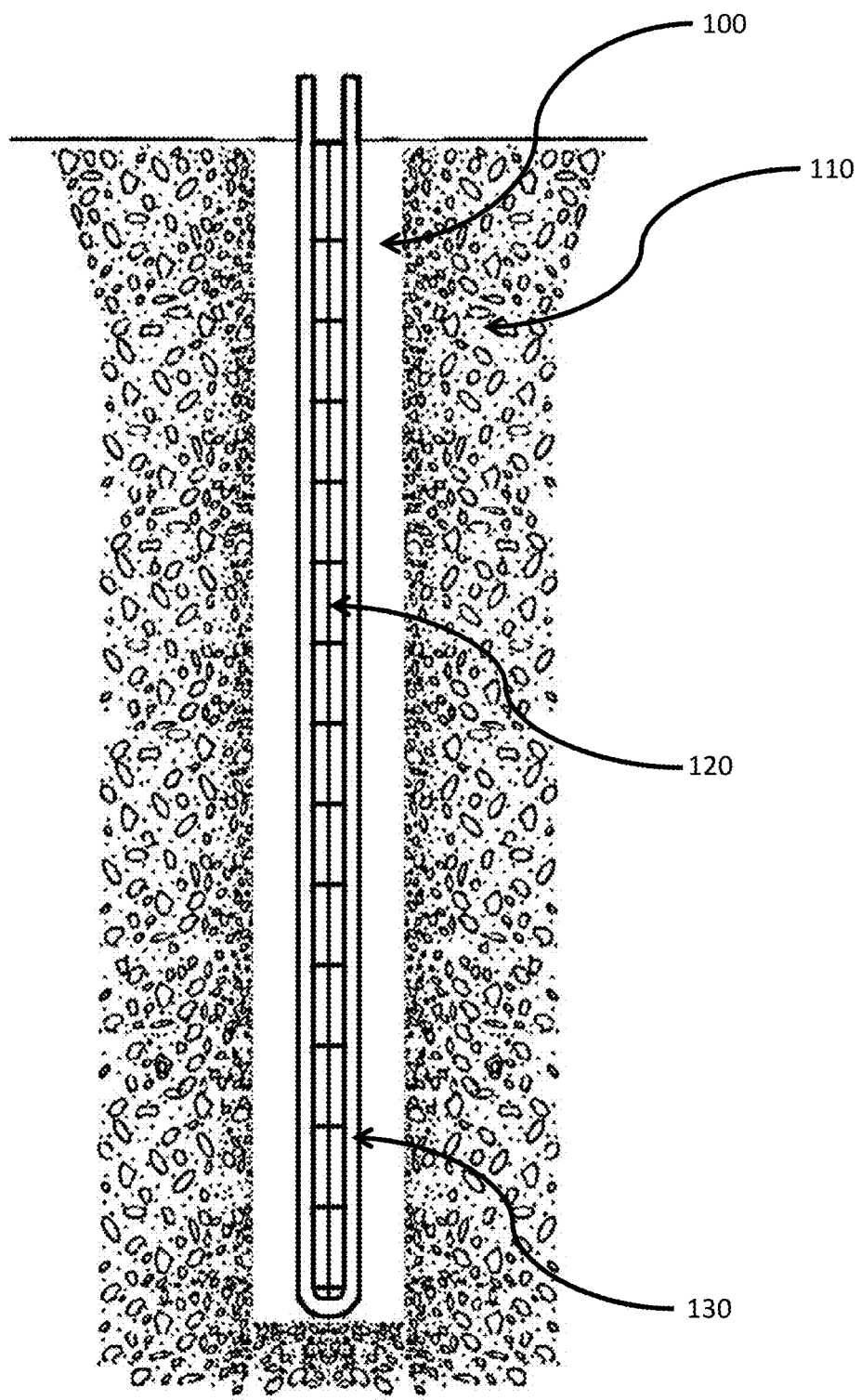
FIG. 1 illustrates a prior art configuration before grout is added.
Figure 2:
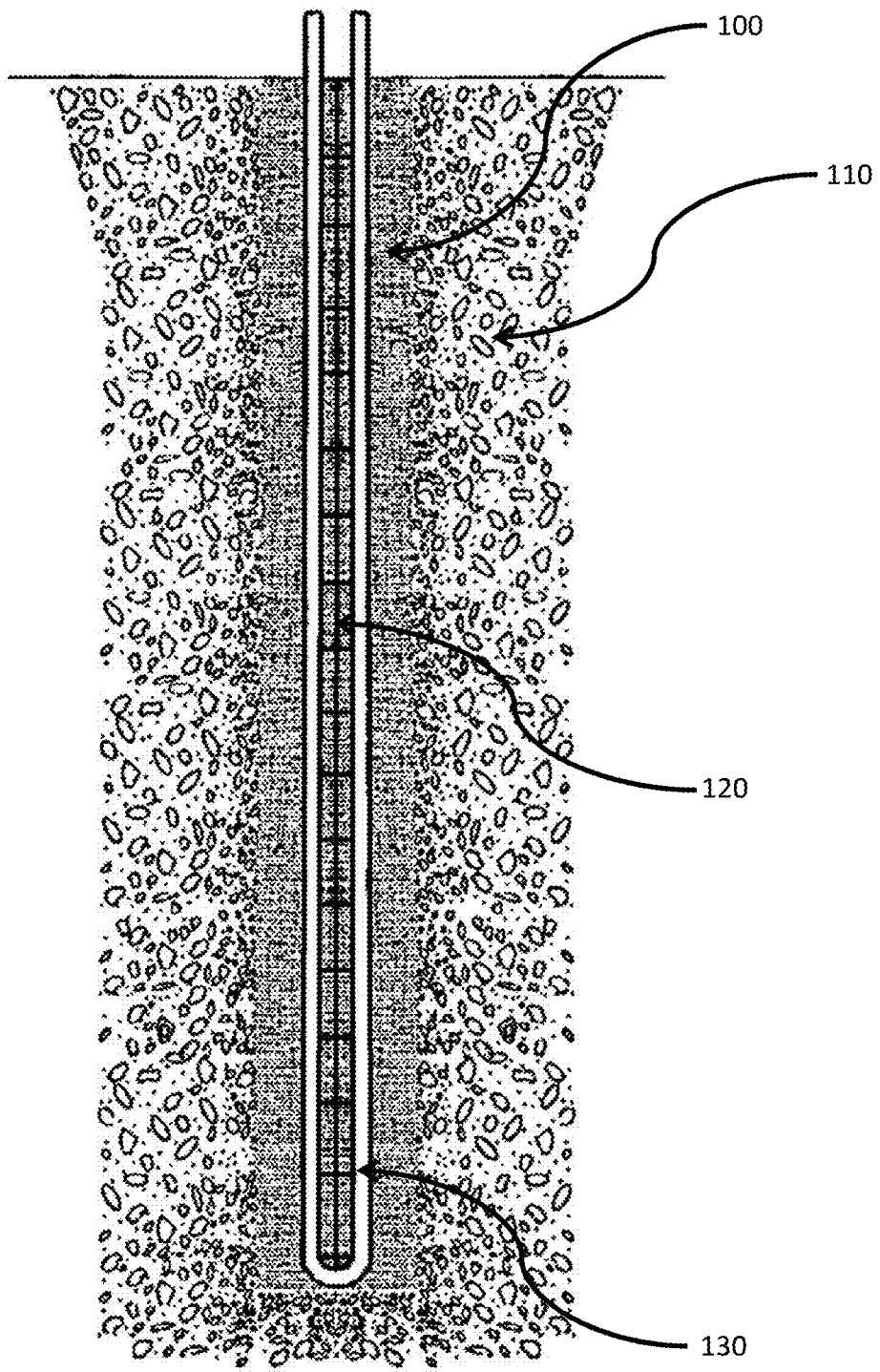
FIG. 2 illustrates a prior art configuration after grout is added.

The invention relates to a foundation element in the ground, which is formed of a hardenable mass, wherein, prior to hardening, at least one heat exchanger element is inserted.

The invention further relates to a method for producing a foundation element, in which a hole is produced in ground, in which a foundation element is formed by means of a hardenable mass, wherein, prior to the hardening of the mass, at least one heat exchanger element is inserted.

When constructing buildings it may be necessary, depending on the ground conditions, to provide specific foundation measures for the structure. For instance it may be necessary to provide bored piles to transfer the structural load into deeper ground layers.

Furthermore, with the production of foundation elements, foundation measures can also comprise a production of retaining or cut-off walls in the ground. Such foundation elements can be realized as bored pile walls or diaphragm walls for example.

It is generally known that foundation elements of such type are activated geothermally. For this purpose, heat exchanging elements can be built into the foundation elements so that the heat potential of the ground can be utilized by means of a heat pump for a geothermal heating. Conversely, for an air conditioning of a building excess heat can also be dissipated into the ground via the heat exchanging elements in the foundation elements.

Especially for the cooling of a building, under environmental aspects and in particular also in consideration of noise emission, the dissipation of excess heat into the ground proves to be more advantageous than the emission of excess heat to ambient air.

The invention is based on the object to provide a foundation element in the ground and a method for producing the foundation element which are particularly well-suited for geothermal activation.

The object is achieved on the one hand by a foundation element having the features discussed below and on the other hand by a method having the features also discussed below. Preferred embodiments of the invention are stated in the respective dependent claims.

The foundation element according to the invention is characterized in that a transition region towards the surrounding ground is provided, in which the foundation element is formed of crushed ground material of the surrounding ground with a hardening suspension.

The invention is based on the finding that an efficient utilization of foundation elements for geothermal activation significantly depends on the heat transfer between the foundation element and the surrounding ground. In this context was established that a defined transition between the foundation element on the one hand and the surrounding ground on the other hand is not conducive to an efficient heat transfer. In contrast, the invention is substantially based on the fact that between the foundation element and the surrounding ground a specific transition region is provided, in which the foundation element is formed of crushed ground material of the surrounding ground with a hardening suspension. This is, so to say, a smooth or non-distinct transition between the foundation element and the surrounding ground. Especially from a thermal viewpoint this has the effect that the foundation element is embedded in a better way in the surrounding ground. This enables the foundation element to better emit heat to the surrounding ground or absorb heat from the surrounding ground. Due to the absence of a distinct separating layer the heat transfer is impeded to a lesser extent. A possible explanation for this can be seen in the fact that the foundation element is embedded with a large internal surface in the ground. This allows for an improved heat transmission.

Figure 3:
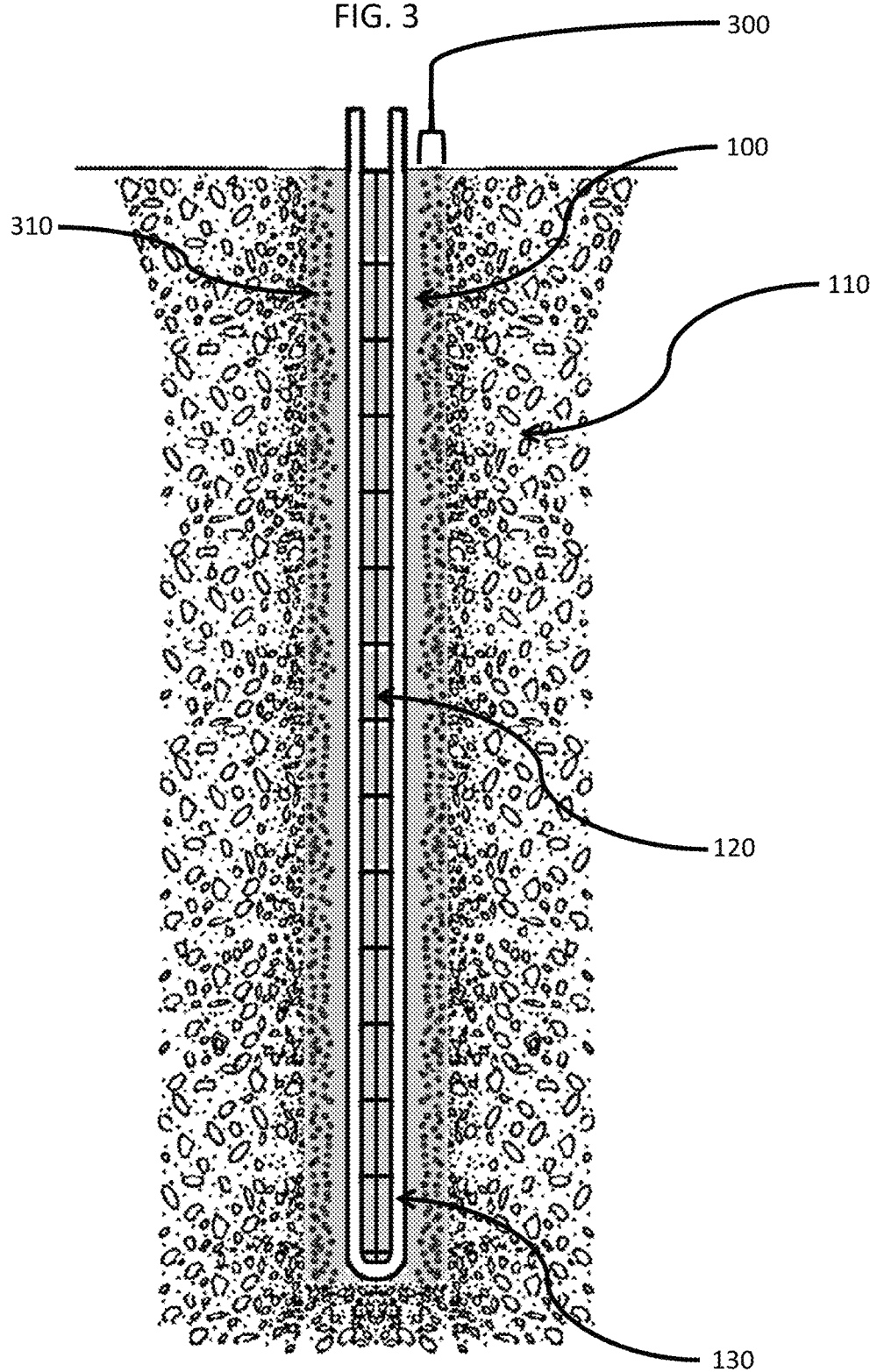
FIG. 3 illustrates a foundation element including a transition region according to a disclosed embodiment.

FIGS. 3 and 4 illustrate foundation elements that include transition regions according to the disclosed embodiments. In particular, FIGS. 3 and 4 illustrate a borehole 100 that is formed in the ground 110. A heat exchanger 130 is inserted into the borehole 100, and a reinforcing element 120 is provided to support the heat exchanger 130.

As shown in FIG. 3, a transition region 300 is formed of crushed ground material 310 and a hardenable suspension. The crushed ground material 310 is produced when the borehole 100 for the foundation element is produced in the ground. The transition region 300 is provided within the cross-sectional shape of the borehole 100, and the material consistency of the foundation element may vary over the cross-sectional shape. Furthermore, the transition region 300 preferably consists of at least 30% of crushed ground material 310.

As shown in FIG. 4, a transition region 400 is formed of crushed ground material 410 and a hardenable suspension. The crushed ground material 410 is produced when the borehole 100 for the foundation element is produced in the ground. The transition region 400 is provided within the cross-sectional shape of the borehole 100, and may extend across the entire foundation element. Furthermore, the transition region 400 preferably consists of at least 30% of crushed ground material 410.

A preferred embodiment of the invention resides in the fact that the transition region consists of at least 30%, preferably between 40% to 80%, of crushed surrounding ground material.

According to a further embodiment variant of the invention a particularly good thermal embedding is accomplished in that the proportion of crushed ground material increases towards the outside. This permits on the one hand a high solidity of the foundation element in a core region and a good thermal connection towards the outside.

In a further embodiment variant of the invention it is advantageous for at least one metal reinforcing element to be inserted in a center region of the foundation element. The reinforcing element can be a reinforcing cage of construction steel or a beam which is preferably also formed of construction steel. Through this, a high stability and solidity of the foundation element is furthermore ensured.

According to a further development of the invention it is advantageous for the at least one metal reinforcing element to be in contact with the at least one heat exchanger element. By preference, the heat exchanger element, which preferably is a pipeline or hose line for a heat transmitting fluid, is firmly arranged on the reinforcing element. Hence, the metal reinforcing element can assist a transfer of heat from the heat exchanger element to the foundation element.

Another preferred embodiment of the invention resides in the fact that the transition region amounts to at least 10% of the wall thickness of the foundation element. In the remaining core region of the foundation element the said foundation element can be produced of a conventional concrete mass. Basically, the foundation element can on the whole be formed by making use of crushed ground material.

According to the invention it is particularly preferred that the transition region amounts to between 20% to 50% of the wall thickness of the foundation element. In this case the wall thickness can be a diameter of a bored pile or the wall thickness of a retaining or diaphragm wall. This can be formed as a bored pile wall of partially overlapping bored piles or of diaphragm wall panels with a rectangular cross-section.

Another preferred embodiment of the invention resides in the fact that the hardenable suspension has cement paste or a cement suspension. For this, initially, a hole in the ground is produced by means of a drilling tool or a diaphragm wall cutter, in which the removed crushed ground material remains at least partially. By preference, during the production of the borehole a hardenable suspension, in particular cement paste, is added to mix this with the crushed ground material and thereby produce a ground mortar at least in an external region of the hole or across the entire cross-section of the hole. Basically, during retraction of the tool, more particularly the drilling tool, it is possible that a concrete mass, which differs from the previously produced ground mortar, is fed e.g. via a hollow core pipe into a center region of the foundation element. In this way, a foundation element can be formed that has a different material consistency over the cross-section.

According to a further development of the invention it is advantageous for the heat exchanger element to have a hose line or pipeline which extends along the foundation element from an upper side to an underside and back again. On the upper side of the foundation element the heat exchanger element can thus be connected to a heating or cooling circuit of a heating and/or air conditioning system. Here, the system can preferably comprise a heat pump in order to thereby set a higher temperature difference for the heat transmission.

The hose line or pipeline can have a single loop in the lower region of the foundation element or a helical line lead in order to thereby increase a contact surface. The line can be designed as a low-cost plastic line or a metal pipeline that has a higher thermal conduction coefficient.

The heat exchanger element can basically be introduced into the foundation element at any chosen suitable point in time. It is especially advantageous for the heat exchanger element to be introduced into the still flowable mass of the foundation element after the production of the foundation element and before its hardening. The introduction can take place separately or concurrently with the introduction of a metal reinforcing element, such as a reinforcing cage or a steel beam.

According to a further development of the invention it is particularly advantageous for at least one cover plate to be arranged on a lower loop-shaped end region of the heat exchanger element. The cover plate can be bent in an angled manner and directed downwards, whereby a better introduction of the heat exchanger element into the as yet not hardened foundation element is rendered possible. In doing so, the cover plate provides protection against the crushed ground material in the mass of the foundation element.

The method according to the invention is characterized in that the foundation element is designed with a transition region towards the surrounding ground, in which the foundation element is formed of crushed ground material and a hardenable suspension.

With this method the previously described foundation element can preferably be produced. Accordingly, the advantages set out beforehand can be attained.

Basically, the hole for forming the foundation element can be produced in any chosen way. According to an embodiment of the invention it is particularly advantageous for the hole to be produced through drilling or cutting. For this purpose, suitable drilling apparatuses or diaphragm wall cutters can be employed that crush in-situ ground material. This crushed ground material can initially be discharged from the hole and, after formation of a hardenable mass, can be re-fed at least partially into the hole again so as to harden into the foundation element. Alternatively, the ground material crushed during drilling or cutting can remain at least partially in the borehole and, through the feeding of a hardenable suspension, can be mixed there in-situ into a ground mortar which then hardens into the foundation element.

Another preferred method variant resides in the fact that the at least one heat exchanger element is fixed on at least one reinforcing element and inserted together with this into the hole. In this way, the heat exchanger element can be introduced in a positionally precise manner. Moreover, the metal reinforcing element can contribute to an improved heat transfer between the heat exchanger element and the ground mortar mass of the foundation element.

The invention claimed is:

1. A foundation element in the ground, which is formed of a hardenable mass, wherein, prior to hardening, at least one heat exchanger element is inserted into the foundation element, the foundation element comprising:
   a defined transition region towards the surrounding ground, the transition region being formed of a mixture of a hardening suspension and crushed ground material of the surrounding ground, the crushed ground material being produced when a borehole in the ground for the foundation element is produced, wherein
   the foundation element has a cross-sectional shape corresponding to a shape of the borehole or a shape of a cut slit,
   the transition region is provided within the cross-sectional shape,
   at least one metal reinforcing element is disposed within a center region of the foundation element, the at least one metal reinforcing element being in contact with the at least one heat exchanger, a material consistency of the foundation element varies over the cross-sectional shape, the transition region consists of at least 30% of crushed ground material, and the transition region amounts to at least 10% of a wall thickness of the foundation element.

2. The foundation element according to claim 1, wherein the proportion of crushed ground material increases towards the outside of the foundation element.

3. The foundation element according to claim 1, wherein the transition region amounts to between 20% to 50% of a wall thickness of the foundation element.

4. The foundation element according to claim 1, wherein the hardenable suspension has cement paste or a cement suspension.

5. The foundation element according to claim 1, wherein the at least one heat exchanger element has a hose line or pipeline which extends along the foundation element from an upper side to an underside and back to the upper side again.

6. The foundation element according to claim 1, wherein on a lower loop-shaped end region of the at least one heat exchanger element at least one cover plate is arranged.

7. The foundation element according to claim 1, wherein the transition region consists of between 40% to 80% of crushed ground material.

8. The foundation element according to claim 1, wherein the cross-sectional shape has a diameter or a rectangular cross-section.

9. A method for producing the foundation element according to claim 1, the method comprising:

producing the borehole in the ground, in which the foundation element is formed by means of the hardenable mass, wherein, prior to the hardening of the hardenable mass, the at least one heat exchanger element is inserted into the foundation element, wherein the foundation element comprises the defined transition region towards the surrounding ground, the transition region being formed of the mixture of the hardening suspension and the crushed ground material of the surrounding ground.

10. The method according to claim 9, wherein the borehole is produced through drilling or cutting.

11. The method according to claim 9, wherein the at least one heat exchanger element is fixed on the at least one metal reinforcing element and inserted together with the at least one metal reinforcing element into the borehole.

12. A method for producing the foundation element according to claim 1, wherein in the borehole, in a first step, a ground mortar is produced by mixing the crushed ground material with the hardenable suspension, and in a second step, a concrete mass which differs from the ground mortar is fed via a hollow core pipe into a center region of the borehole.

\* \* \* \* \*